United States Patent Office 3,498,334
Patented Mar. 3, 1970

3,498,334
TREATMENT OF CONCRETE
James H. Pittman, Jr., and Edward E. Runyan, Midland, Tex., assignors to Permian Enterprises, Inc., Midland, Tex., a corporation of Texas
No Drawing. Continuation-in-part of application Ser. No. 554,649, June 2, 1966. This application May 1, 1967, Ser. No. 634,886
Int. Cl. C04b 41/26
U.S. Cl. 138—145                              20 Claims

ABSTRACT OF THE DISCLOSURE

This patent discloses a cement product such as a cement-lined pipe and a process of treating cement with a silicofluoride solution to obtain an acid-resistant surface on the cement.

---

This application is a continuation-in-part of application Ser. No. 554,649 filed June 2, 1966, now abandoned.

This invention relates to the treatment of concrete.

It is well known that silicofluorides have the capacity to render concrete more resistant to acids and attack from many different compounds. These compounds also have the capacity of hardening the surface of concrete to reduce wear. The known methods of treating concrete with hydrous silicofluorides does not give sufficient protection where the concrete is used in water injection service.

Gaseous silicofluoride has been used to treat concrete and concrete so treated is capable of withstanding acid attack. However, the silicofluoride gas treatment is expensive, and is not acceptable in services which require that the concrete retain its self-healing characteristics as these characteristics are destroyed in the silicofluoride gas treatment of small diameter pipe. The silicofluoride gas treatment must be delayed until after the cement has cured because the cement must be predried.

Liquid silicofluoride treatment of cured concrete is well known and results in some protection of the surface against acid attack and abrasion. This known treatment method does not result in sufficient protection to be useful in severe acid service.

It has been reported in Concrete Products, July 1960 issue that the treatment of concrete with a water solution of fluoride results in a protective layer of about .008 to .012 as contrasted with a depth of treatment of .3 inch when treating with silicofluoride gas. Thus, the protection obtained with a water solution is not sufficient for concrete lined pipe used in acid service. The silicofluoride gas treatment penetrates too deep as the pipe lining is less than 3/10 of an inch for pipe of 8 inch OD and below. This complete penetration destroys the self-healing characteristics of the cement. For larger pipe the reported penetration would not extend through normal concrete lining. The treatment of lined pipe with silicofluoride gas has the additional disadvantage of requiring expensive equipment to first place the pipe under vacuum and then subject the pipe to the silicofluoride.

It is an object of this invention to provide a simple inexpensive method of treating concrete, particularly concrete lined steel pipe, to make it acid resistant.

Another object is to provide a simple inexpensive method of treating concrete, particularly the concrete lining of steel pipe, to make it acid resistant while retaining the self-healing characteristics of cement at least in some areas.

Another object is to provide a method of treating cement lined steel pipe which results in the ID layer of the cement of being acid resistant and the OD layer of the cement which is next to the pipe retaining its self-healing characteristics.

Another objective is to provide a method of treating cement with an aqueous silicofluoride in which the acid resistance of the concrete is much greater than heretofore obtained.

Another objective is to provide a method of treating cement with an aqueous silicofluoride to obtain much greater acid resistance than heretofore possible in which the cement may be treated while curing by unskilled personnel using simple inexpensive equipment without detrimental effect on the cement.

Other objectives, features, and advantages of this invention will be apparent from the specifications and the claims.

In accordance with this invention concrete is treated with an aqueous silicofluoride solution before the concrete has set, preferably as soon as possible after the cement has been cast. The cement is soaked in the solution for a sufficient time to give the desired acid resistant characteristics, and then the cement may be cured in any desired manner.

Any desired hydraulic cement containing calcium oxide may be treated with silicofluoride in accordance with this invention. If desired, the cement may contain any of the well known retardents and accelerators to control setting of cement and the times given herein would, of course, vary where there are additives present. The method works equally well on mortars of hydraulic cement and sand or mixtures of hydraulic cement and pozzolans. By way of example the hydraulic cement may have the following chemical analysis:

| Component | Percent |
|---|---|
| Silicon dioxide | 20.8 |
| Aluminum oxide | 3.1 |
| Iron oxide | 5.6 |
| Calcium oxide | 65.2 |
| Magnesium oxide | 1.0 |
| Sulphur trioxide | 2.6 |
| Sodium oxide | 0.8 |

A typical pozzolan may have the following chemical analysis:

| Component | Percent |
|---|---|
| Silicon dioxide | 45.5 |
| Iron oxide | 13.7 |
| Aluminum oxide | 16.7 |
| Calcium oxide | 9.1 |
| Magnesium oxide | 2.2 |
| Sodium oxide | 6.9 |
| Potassium oxide | 2.9 |

The data given herein was developed using hydraulic cements and pozzolans having substantially the above typical analysis. While any cement may be treated by the method of this invention, it is particularly applicable in treating lined pipe and the disclosure herein will be directed to this service.

In the production of oil, many formations are being subjected to a waterflood in which water is pumped into formation to replace oil and drive it to the surface. Many oil wells produce water which must be disposed of by injection into the earth through a disposal well. In both instances the injected water may carry mineral deposits which plug the face of the formation. The formation face is customarily opened by treating with a 15% to 30% solution of hydrochloric acid solution. This injection water and acid may be injected through cement lined pipe.

A typical steel pipe is lined with either a 1/3 hydraulic cement-2/3 sand mortar or a mixture of 60% hydraulic cement and 40% pozzolan. In either case, the pipe is spun to line the pipe centrifugally. Where the cement-pozzolan mixture is used, the pipe is usually spun at high speed and there results a dry, water demanding, lining.

After the cement is cast in the desired shape as by the conventional centrifugal casting method, it is treated with hydrous silicofluoride. This treatment is begun at an early state in the curing of the concrete, and is continued for a sufficient length of time to obtain the desired acid resistance. Use of the preferred method will result in a treated layer of concrete which has been shown by qualitative analysis and X-rayed diffraction of powdered samples to extend for approximately 1/10″ from the treated surface (ID of concrete lining).

The treating material may be any desired silicofluoride compound which has a sufficient number of silics and fluoride ions present and which is sufficiently soluble in water to effect the treatment. It has been found that fluosilicic acid ($H_2SiF_6$), magnesium silicofluoride $$(MgSiF_6)$$

and calcium silicofluoride ($CaSiF_6$) are all excellent sources of silicofluoride.

In the case of calcium silicofluoride and magnesium silicofluoride, it is preferred to use a slightly under saturated solution having a specific gravity of approximately 1.18 at ambient temperautre (70° F.). Use of a fully saturated solution may result in supersaturation and a wasteful deposition of salts. In the case of the fluosilicic acid a 15% solution has been found to be satisfactory.

In accordance with this invention, the soaking in a silicofluoride solution is carried out at an early state of cure of the concrete. It has been found that if the concrete is permitted to fully cure, the results of this invention will not be obtained.

The treatment of the concrete may begin as soon as the concrete has set sufficiently to hold its shape. For instance, in centrifugally-lined pipe using the hydraulic cement-pozzolan mixture, the soaking of the concrete may commence immediately after the pipe is removed from the spinning machine. Good results have been obtained with this type of concrete where the soaking has been commenced at any time between removal of the pipe from the machine and the time at which the concrete begins to crack due to lack of water. The elapsed time is approximately six hours where the pipe is spun at high speed. It will be appreciated that the water in the soaking solution provides the needed water for the concrete to prevent cracking.

It has been found that when the pozzolan-cement mixture is kept moist artificially, the precure time can be extended. Thus, if the pipe is covered to prevent air circulation, the precure can be extended to about 16 hours. At this time the blisters are formed during the treating step to such an extent that the product is of questionable value. Under these blisters depressions are found which reduce the flow characteristics of the pipe. The depressions are also objectionable as they reduce the wall thickness and probably the degree of protection.

The blisters begin to form during the treating step with about 12 hours of precure and increase with additional precure time until at 36 hours of precure about one half of the surface is cured. Thus, the precure can be extended in this manner without damage to the surface to about 10 hours of precure.

In the case of a cement which does not have the problem of needing additional water for curing, such as a mixture of one part cement to two parts sand spun at low speed, treatment with the silicofluoride solution may be delayed approximately eight hours after casting.

Thus, water demanding pozzolan-cement mixture if not protected can be precured approximately 6 hours; water demanding pozzolan-cement mixture which is artificially moistened can be precured approximately 10 hours; and a cement-sand mixture can be precured approximately 8 hours, all with excellent results. Of course, these times can be extended with acceptance of a slightly inferior product. Obviously the precure time may change with the addition of accelerators or retardents and with change in composition of the mixture. Thus, there is a stage in the setting of cement which varies with composition and method of treatment at which the cement may be said to be cured to the extent that inferior results are noticed which progressively increases with additional setting time. In the claims cement mixtures which have reached this stage are considered to be cured with reference to this method.

The treatment of the concrete should be for a sufficient time to give the desired acid resistant characteristics. Thus, the treatment should begin soon enough after casting and continue for a sufficient length of time to give the desired acid resistant characteristics. This will vary with the desired degree of resistance. For instance, a ½ hour soaking time will give noticeable protection. The degree of protection will increase with soaking time up to about ten to twelve hours. It is preferred that the concrete be treated approximately ten to twelve hours as this will fully protect the cement during a number of acid treatments of a well through the cement lined pipe.

The treatment should be for sufficient time to permit the concrete to withstand circulation of 15%–30% hydrochloric acid at a rate of approximately 9 feet per second for at least 30 minutes. Preferably the concrete should be able to withstand the circulation of acid for approximately 2½ hours where it is to be used in water injection service.

It has been found that if the hydraulic cement-pozzolan lining is treated for 10 hours beginning within 6 hours after casting, the concrete will have a protective layer approximately 1/10 of an inch in depth and will withstand circulation of 15% hydrochloric acid at approximately 9 feet per second for 30 minutes.

When concrete lined pipe is suspended in a well, cracks will occur in the cement lining due to the difference in stretch of the pipe and lining under tension. These cracks will be very small and it has been found that damage to the steel pipe through these cracks will not occur due to the self-healing characteristics of lining adjacent to the pipe. As this portion of the lining has not been effected by the treatment, free lime is present which maintains the solution in the crack on the alkaline side to prevent damage.

Data supporting the above conclusion is as follows:

Treatment of old fully cured line pipe

| Sample No. | Acid | Flow rate, b.p.m. | Minutes | Cement lost (lb.) | Loss of cement approx., percent |
|---|---|---|---|---|---|
| 1 | 15% HCL | 1.5 | 30 | 3.77 | 94 |
| 2 | 15% HCL | 1.5 | 30 | 4.08 | 100 |
| 3 | 15% HCL | 1.5 | 30 | 4.02 | 100 |
| 4 | 15% HCL | 1.5 | 30 | 3.22 | 80 |

Treatment of new lined pipe

| Sample No. | Acid | Flow rate, b.p.m. | Minutes | Cement lost (lb.) | Loss of cement approx., percent |
|---|---|---|---|---|---|
| 5 | 15% HCL | 1.5 | 30 | 0.07 | 2 |
| 6 | 15% HCL | 1.5 | 60 | 0.10 | 2 |
| 7 | 15% HCL | 1.5 | 60 | 0.17 | 4 |
| 8 | 15% HCL | 1.5 | 60 | 0.12 | 3 |

The new lined pipe was permitted to pre-cure for 3 hours. All 8 samples were soaked in a vat containing a concentrated silicofluoride solution for at least 10 hours. The acid solution used was 15% hydrochloric acid and water. The flow rate of 1.5 b.p.m. (barrels per minute) resulted in a rate of approximately 9 feet per second.

It will be noted that the cement from the old pipe was substantially removed whereas the loss of cement where the lined pipe was treated in accordance with this invention was less than 4%.

The following data shows that the cement-pozzolan lined pipe may be permitted to pre-cure before treatment up to 6 hours. In this group of tests the specimens were subjected to soaking in a $MgSiF_6$ solution for at least ten hours and to circulation of approximately 5500 gallons of hydrochloric acid. All data herein was developed by circulation of 15% hydrochloric acid through a 2⅜″ tubing with the inside dimension of the cement lining being approximately 1.682 inches in diameter. This gives a circulation rate of approximately 9 feet per second.

The following test specimens were subjected to circulation of 5500 gallons of hydrochloric acid.

| | Pre-cure | Treating Material (Saturated Solution) | Condition |
|---|---|---|---|
| 1 | 0 hour | $MgSiF_6$ | Perfect. |
| 2 | ½ hour | $MgSiF_6$ | Do. |
| 3 | 1 hour | $MgSiF_6$ | Do. |
| 4 | 1½ hours | $MgSiF_6$ | Do. |
| 5 | 3 hours | $MgSiF_6$ | Good appearance, not quite as good as Nos. 1 through 4. |
| 6 | 4 hours | $MgSiF_6$ | Do. |
| 7 | 6 hours | $MgSiF_6$ | Some penetration through ½ of lining but lining still intact |

From this data it is apparent that the pre-cure can be delayed up to 6 hours, the time at which damage to concrete results from lack of moisture.

The following data shows that the concrete obtains substantial protection with a minimum of 2 hours of soak and is completely protected at 10 to 12 hours of treatment.

| | Pre-cure (hours) | Treatment $MgSiF_6$ (saturated solution) (hours) | Steam cure (hours) | Gallons of HCL, 15% by wt. | Appearance |
|---|---|---|---|---|---|
| 1 | 3 | 0 | 18 | 2,000 | Lining completely gone. |
| 2 | 3 | 2 | 18 | 9,450 | Several medium holes. |
| 3 | 3 | 4 | 16 | 9,450 | Do. |
| 4 | 3 | 6 | 14 | 9,450 | Several small holes. |
| 5 | 3 | 8 | 14 | 9,450 | Few small holes. |
| 6 | 3 | 10 | 10 | 9,450 | No damage. |
| 7 | 3 | 12 | 8 | 9,450 | Do. |

The following data shows the pre-cure time for a hydraulic cement sand mixture of 2 parts and 1 part cement. From this data it is apparent that soaking should commence within 8 hours after casting.

| | Pre-cure (hours) | Treatment with $MgSiF_6$ (saturated solution) (hours) | Steam cure (hours) | Gallons of HCL | Condition |
|---|---|---|---|---|---|
| 1 | 6 | 12 | 12 | 1,300 | No damage. |
| 2 | 8 | 12 | 12 | 1,300 | Do. |
| 3 | 10 | 12 | 12 | 1,300 | Few small holes. |
| 4 | 12 | 12 | 12 | 1,300 | Few large holes. |
| 5 | 14 | 12 | 12 | 1,300 | Large increase in diameter. |
| 6 | 16 | 12 | 12 | 1,300 | Do. |
| 7 | 18 | 12 | 12 | 1,300 | Do. |

Immediately after inspection another 1300 gallons of acid was circulated through the pipe. Samples 1 and 2 remained undamaged. The damages to samples 3 through 7 was of the same general nature but more severe.

The following tests were conducted in 1½″ pipe at a flow rate of 20 gallons per minute. Tests show that a degree of acid resistance is obtained only after 15 minutes of soaking and confirms that substantial protection is obtained after two hours of treatment.

| | Pre-cure (hours) | Treatment with $MgSiF_6$ Sp. G. 1.18 (hours) | Steam cure (hours) | Gallons HCl 24% by weight at 20 ft/min. | Condition |
|---|---|---|---|---|---|
| 1D | 3 | 0 | 12 | 2,400 | Lining completely gone. |
| 2D | 3 | ¼ | 12 | 6,000 | Large holes. |
| 3D | 3 | ½ | 12 | 6,000 | Medium holes. |
| 4D | 3 | ¾ | 12 | 6,000 | Small holes. |
| 5D | 3 | 1 | 12 | 6,000 | Some damage. |
| 6D | 3 | 1½ | 12 | 6,000 | Slight damage. |
| 7D | 3 | 2 | 12 | 6,000 | No damage. |
| 8D | 3 | 2½ | 12 | 6,000 | Do. |
| 9D | 3 | 3 | 12 | 6,000 | Do. |

The following data shows that pre-cure time can be extended to periods on the order of 16 hours or more if the cement is subjected to a sufficiently moist atmosphere during pre-cure. The test specimens were covered during pre-cure to prevent evaporation.

| Pre-cure | Treatment $MgSiF_6$ Sp.g.1.18 (hrs.) | Steam cure | Gallons of HCl 24% by weight at 20 gt/min. | Appearance |
|---|---|---|---|---|
| 6 | 15 | 12 | 6,000 | Excellent. |
| 8 | 15 | 12 | 6,000 | Do. |
| 10 | 15 | 12 | 6,000 | Do. |
| 12 | 15 | 12 | 6,000 | Rough surface, holes. |
| 14 | 15 | 12 | 6,000 | Do. |
| 16 | 15 | 12 | 6,000 | Do. |
| 18 | 15 | 12 | 6,000 | Very rough surface, no holes. |
| 24 | 15 | 12 | 6,000 | Do. |
| 36 | 15 | 12 | 6,000 | Do. |

From this data it is apparent that prolonged pre-cure result in a reduced surface quality.

The following tests were run to demonstrate that the described treatment is effective on cement mixtures generally. All samples were pre-cured 3 hours, treated 15 hours with $MgSiF_6$ and steam cured 12 hours.

| Composition | Gallons of HCl at 20 gl./min. | Appearance |
|---|---|---|
| Type 1,[1] cement 60%, sand 40% | 9,000 | No failure. |
| Type 35,[1] cement 60%, sand 40% | 6,000 | Do. |
| Type 35,[2] cement 60%, silica flour 20%, sand 20%. | 9,000 | Do. |
| Type 35,[2] cement 60%, silica flour 20%, Pozzolan 20%. | 9,000 | Do. |
| Type 35,[2] cement 40%, silica flour 30%, Pozzolan 30%. | 9,000 | Do. |
| Type 35,[2] cement 60%, silica flour 40% | 9,000 | Do. |

[1] Type 1—Common hydraulic building cement for construction purposes.
[2] Type 35—Hydraulic cement having the composition given herein above.

From the above it will be seen that the objects of this invention have been attained. A method of treating concrete to provide an acid resistant layer which penetrates approximately 1/10 of an inch and which will protect against extreme acid attack has been provided. The method will protect concrete in any service. The method is extremely valuable for cement lined pipe as it provides an inexpensive simple way to protect pipe without destroying the self-healing characteristics of the cement.

While the foregoing specification sets forth a detailed description of embodiments of this invention, it will be apparent to those skilled in the art that many modifications in the details given herein may be made without departing from the spirit and the scope of the invention.

What is claimed is:

1. In a process of manufacturing cement articles comprising,
   mixing hydraulic cement containing calcium oxide with water,
   casting said mixture in the desired form,
   and treating a surface of said cast mixture with a hydrous silicofluoride solution,
   the improvement which comprises beginning said treatment within sixteen hours after casting.

2. The process of claim 1 wherein the silico-fluoride in said solution is selected from the group consisting of hydrofluosilicic acid, calcium silicofluoride and magnesium silicofluoride.

3. In a process of manufacturing cement articles comprising,
   mixing hydraulic cement containing calcium oxide with water,
   casting said mixture in the desired form,
   treating a surface of said cast mixture with a hydrous silicofluoride solution,
   the improvement which comprises beginning said treatment within sixteen hours after casting,
   and continuing said treatment for at least two hours.

4. The process of claim 3 wherein the silicofluoride in said solution is selected from the group consisting of hydrofluosilicic acid, calcium silicofluoride and magnesium silicoflouride.

5. The process of claim 3 wherein the surface is treated for at least ten hours.

6. The process of claim 3 wherein the silicofluoride in said solution is selected from the group consisting of hydrofluosilicic acid, calcium silicoflouride and magnesium silicofluoride and the surface is treated for at least ten hours.

7. In a process of manufacturing acid resistant cement lined pipe comprising,
   mixing hydraulic cement containing calcium oxide with water,
   centrifugally casting said mixture in a pipe to provide a cement lining in said pipe,
   and treating the exposed surface of said lining with a hydrous silicofluoride solution,
   the improvement which comprises beginning said treatment within sixteen hours after casting.

8. In a process of manufacturing acid resistant cement lined pipe comprising,
   mixing hydraulic cement containing calcium oxide, pozzolans and water,
   centrifugally casting said mixture in a pipe to provide a dry, water demanding cement lining in said pipe,
   and treating the exposed surface of said lining with a hydrous silicofluoride solution,
   the improvement which comprises beginning said treatment within six hours after casting and continuing said treatment for at least two hours.

9. The process of claim 8 wherein the surface is treated for at least ten hours.

10. The process of claim 8 wherein the silicofluoride in said solution is selected from the group consisting of hydrofluosilicic acid, calcium silicofluoride and magnesium fluoride.

11. The process of claim 8 wherein the silicofluoride in said solution is selected from the group consisting of hydrofluosilicic acid, calcium silicofluoride and magnesium silicofluoride;
    and the surface is treated for at least ten hours.

12. In a process of manufacturing cement articles comprising,
    mixing hydraulic cement containing calcium oxide with water,
    casting said mixture in the desired form,
    and treating a surface of said cast mixture with a hydrous silicofluoride solution,
    the improvement which comprises beginning said treatment for a sufficient length of time to provide a protective layer which will withstand a fifteen percent hydrochloric acid solution circulated over the surface at a rate of nine feet per second for one-half hour without substantial damage to the cast mixture.

13. The process of claim 12 wherein the silicofluoride in said solution is selected from the group consisting of hydrofluosilicic acid, calcium silicofluoride and magnesium silicofluoride.

14. In a process of manufacturing cement articles comprising,
    mixing hydraulic cement containing calcium oxide with water,
    casting said mixture in the desired form,
    and treating a surface of said cast mixture with a hydrous silicofluoride solution,
    the improvement which comprises beginning said treatment for a sufficient length of time to provide a protective layer approximately 0.1 inch in depth.

15. The process of claim 14 wherein the silicofluoride in said solution is selected from the group consisting of hydrofluosilicic acid, calcium silicofluoride and magnesium silicofluoride.

16. An article of manufacture comprising,
    a cement body containing lime having a layer beginning at a surface of the body and extending approximately one-tenth inch from said surface containing silicoflourides,
    the remainder of said body being substantially free of silicofluorides.

17. An article of manufacture comprising,
    a metallic pipe,
    a lining of cement containing lime in said pipe,
    the lining of cement having an annular section extending radially outwardly approximately one-tenth inch from its inner diameter containing silicofluorides,
    the remainder of said lining of cement being substantially free of silicofluorides.

18. An article of manufacture comprising,
    a metallic pipe,
    a lining of cement containing lime in said pipe,
    the lining of cement having an annular section extending radially outwardly approximately one-tenth inch from its inner diameter containing silicofluorides,
    the remainder of said lining of cement having free lime therein and being substantially free of silicofluorides.

19. In a process of manufacturing acid resistant cement lined pipe comprising;
  mixing hydraulic cement containing calcium oxide, pozzolans and water;
  centrifugally casting said mixture in a pipe to provide a dry, water demanding cement lining in said pipe;
  and treating the exposed surface of said lining with a hydrous silicofluoride solution;
  the improvement which comprises beginning said treatment within sixteen hours after casting and continuing said treatment for at least two hours;
  and preventing circulation of air through the pipe between casting and said treatment.

20. In a process of manufacturing acid resistant cement lined pipe comprising,
  mixing hydraulic cement containing calcium oxide with water and sand,
  centrifugally casting said mixture in a pipe to provide a cement lining in said pipe,
  and treating the exposed surface of said lining with a hydrous silicofluoride solution,
  the improvement which comprises beginning said treatment within eight hours after casting and continuing said treatment for at least two hours.

References Cited

UNITED STATES PATENTS

| | | | |
|---|---|---|---|
| 38,287 | 4/1863 | Coomke | 106—12 |
| 308,263 | 11/1884 | Kessler | 106—12 |
| 2,002,701 | 5/1935 | McWane et al. | 117—97 XR |
| 2,114,692 | 4/1938 | Ward et al. | 106—12 XR |
| 2,203,302 | 6/1940 | Liberthson | 106—12 |
| 2,241,493 | 5/1941 | Van Thiel | 117—97 |
| 2,596,490 | 5/1952 | Jenkins | 117—97 XR |
| 3,287,801 | 11/1966 | Blenkarn | 264—270 XR |

JULIUS FROME, Primary Examiner

L. B. HAYES, Assistant Examiner

U.S. Cl. X.R.

106—12, 98; 264—79, 270; 117—97